United States Patent

Hsu

[11] Patent Number: 6,024,859
[45] Date of Patent: Feb. 15, 2000

[54] PRESSURIZED INTEGRATED ELECTROCHEMICAL CONVERTER ENERGY SYSTEM AND METHOD

[75] Inventor: Michael S. Hsu, Lincoln, Mass.

[73] Assignee: Ztek Corporation, Waltham, Mass.

[21] Appl. No.: 09/157,218

[22] Filed: Sep. 17, 1998

Related U.S. Application Data

[63] Continuation of application No. 08/871,495, Jun. 9, 1997, which is a continuation-in-part of application No. 08/325,486, Oct. 19, 1994, Pat. No. 5,693,201, which is a continuation-in-part of application No. 08/287,093, Aug. 8, 1994, Pat. No. 5,501,781
[60] Provisional application No. 60/034,836, Dec. 31, 1996.
[51] Int. Cl.⁷ ............... C25B 5/00; C25B 9/00; C25B 15/02
[52] U.S. Cl. .......... 205/343; 205/464; 204/241; 204/270; 138/148; 138/149
[58] Field of Search .............. 138/148, 149; 204/241, 270; 205/464, 478, 637, 343

[56] References Cited

U.S. PATENT DOCUMENTS

| | | | |
|---|---|---|---|
| 3,505,114 | 4/1970 | Rohr | 136/86 |
| 3,607,427 | 9/1971 | White | 136/86 |
| 3,616,334 | 10/1971 | Aker et al. | 204/129 |
| 3,964,930 | 6/1976 | Reiser | 136/86 |
| 4,056,452 | 11/1977 | Campbell | 204/258 |
| 4,085,016 | 4/1978 | Janjua et al. | 204/104 |
| 4,087,976 | 5/1978 | Morrow, Jr. et al. | 60/643 |
| 4,093,100 | 6/1978 | Ford et al. | 138/148 X |
| 4,130,140 | 12/1978 | Cerny et al. | 138/149 |
| 4,197,362 | 4/1980 | Schmidberger et al. | 429/12 |
| 4,219,224 | 8/1980 | Hanley | 138/149 X |
| 4,237,668 | 12/1980 | Mathusima et al. | 138/149 X |
| 4,310,605 | 1/1982 | Early et al. | 429/18 |
| 4,482,440 | 11/1984 | Kadija | 204/105 |
| 4,490,445 | 12/1984 | Hsu | 429/32 |
| 4,574,112 | 3/1986 | Breault et al. | 429/26 |
| 4,583,583 | 4/1986 | Wittel | 165/46 |
| 4,629,537 | 12/1986 | Hsu | 204/15 |
| 4,721,556 | 1/1988 | Hsu | 204/258 |
| 4,853,100 | 8/1989 | Hsu | 204/256 |
| 4,977,041 | 12/1990 | Shiozawa et al. | 429/26 |
| 4,978,589 | 12/1990 | Shiozawa et al. | 429/26 |

(List continued on next page.)

FOREIGN PATENT DOCUMENTS

| | | |
|---|---|---|
| 0 308 976 A1 | 3/1989 | European Pat. Off. . |
| 05343083 | 12/1993 | Japan . |
| 08208203 | 8/1996 | Japan . |
| WO 96/05625 | 2/1996 | WIPO . |

*Primary Examiner*—Donald R. Valentine
*Attorney, Agent, or Firm*—Lahive & Cockfield, LLP; Anthony A. Laurentano

[57] ABSTRACT

An electrochemical converter is disposed within a pressure vessel that collects hot exhaust gases generated by the converter for delivery to a cogeneration bottoming device, such as a gas turbine. The bottoming device extracts energy from the waste heat generated by the converter, such as a fuel cell for the generation of electricity, yielding an improved efficiency energy system. Bottoming devices can include, for example, a gas turbine system or an heating, ventilation or cooling (HVAC) system. The pressure vessel can include a heat exchanger, such as a cooling jacket, for cooling the pressure vessel and/or preheating an input reactant to the electrochemical converter prior to introduction of the reactant to the converter. In one embodiment, a compressor of a gas turbine system assembly draws an input reactant through the pressure vessel heat exchanger and delivers the reactant under pressure to a fuel cell enclosed therein. Pressurized and heated fuel cell exhaust gases are collected by the pressure vessel and delivered to the turbine system expander. The fuel cell and the pressure vessel function as the combustor of the gas turbine assembly. The expander can perform mechanical work, or can be coupled to a generator to provide electrical energy in addition to that provided by the fuel cell. Also disclosed is a feedthrough for transferring a fluid, such as exhaust gases or an input reactant, from outside the pressure vessel to within the pressure vessel.

43 Claims, 5 Drawing Sheets

U.S. PATENT DOCUMENTS

| | | | |
|---|---|---|---|
| 5,330,857 | 7/1994 | Sederquist et al. | 205/343 X |
| 5,338,622 | 8/1994 | Hsu et al. | 429/26 |
| 5,347,806 | 9/1994 | Nakhamkin | 60/39.161 |
| 5,501,781 | 3/1996 | Hsu et al. | 204/269 |
| 5,573,867 | 11/1996 | Zafred et al. | 429/17 |
| 5,693,201 | 12/1997 | Hsu et al. | 204/241 |
| 5,727,599 | 3/1998 | Fisher et al. | 138/149 X |

PRESSURIZED INTEGRATED ELECTROCHEMICAL CONVERTER ENERGY SYSTEM AND METHOD

This application is a continuation application of Ser. No. 08/871,495 filed on Jun. 9, 1997 pending, which in turn is a continuation-in-part application of Ser. No. 08/325,486, filed on Oct. 19, 1994 (now U.S. Pat. No. 5,693,201, issued Dec. 2, 1997, which is a continuation-in-part of Ser. No. 08/287,093 filed Aug. 8, 1994 (now U.S. Pat. No. 5,501,781, issued Mar. 26, 1996). The contents of all of the aforementioned application(s) are hereby incorporated by reference.

REFERENCE TO RELATED APPLICATIONS

This application claims priority under 35 U.S.C. 119(e) to co-pending U.S. provisional application Ser. No. 60/034,836, entitled "Pressurized, Integrated Electrochemical Converter System", filed Dec. 31, 1996, the contents of which are hereby incorporated by reference.

BACKGROUND

This invention relates to high temperature electrochemical converters, such as fuel cells, and more specifically to high performance energy, or power, systems that employ electrochemical converters.

Electrochemical converters, such as fuel cells, convert chemical energy derived from fuel stocks directly into electrical energy. One type of fuel cell includes a series of electrolyte units, onto which fuel and oxidizer electrodes are attached, and a similar series of interconnectors disposed between the electrolyte units to provide electrical connections. Electricity is generated through electrodes and the electrolyte by an electrochemical reaction that is triggered when a fuel, e.g., hydrogen, is introduced over the fuel electrode and an oxidant, e.g., air, is introduced over the oxidizer electrode. Alternatively, the electrochemical converter can be operated in an electrolyzer mode, in which the electrochemical converter consumes electricity and input reactants and produces fuel.

When an electrochemical converter, such as a fuel cell, performs fuel-to-electricity conversion in a fuel cell mode, waste energy is generated and should be properly processed to maintain the proper operating temperature of the electrochemical converter and to boost the overall efficiency of the power system. Conversely, when the converter performs electricity-to-fuel conversion in the electrolyzer mode, the electrolyte must be provided with heat to maintain its reaction. Furthermore, the fuel reformation process, often used with fuel cells, can require the introduction of thermal energy. Thus thermal management of the electrochemical converter system for proper operation and efficiency is important.

Thermal management techniques can include the combination of an electrochemical converter with other energy devices in an effort to extract energy from the waste heat of the converter exhaust. For example, U.S. Pat. No. 5,462,817, issued to Hsu describes certain combinations of electrochemical converters and bottoming devices that extract energy from the converter for use by the bottoming device.

Environmental and political concerns associated with traditional combustion-based energy systems, such as coal or oil fired electrical generation plants, are boosting interest in alternative energy systems, such as energy systems employing electrochemical converters. Nevertheless electrochemical converters have not found widespread use, despite significant advantages over conventional energy systems. For example, compared to traditional energy systems, electrochemical converters such as fuel cells, are relatively efficient and do not produce pollutants. The large capital investment in conventional energy systems necessitates that all advantages of competing energy systems be realized for such systems to find increased use. Accordingly, electrochemical converter energy systems can benefit from additional development to maximize their advantages over traditional energy systems and increase the likelihood of their widespread use.

Accordingly, it is an object of the present invention to increase the efficiency of an energy system that employs an electrochemical converter.

It is yet another object of the invention to simplify energy systems that employ electrochemical converters.

It is yet a further object of the invention to provide a simplified and improved electrochemical converter energy system that extracts energy from waste heat generated by the electrochemical converter.

Although electrochemical converters have significant advantages over conventional energy systems, for example, they are relatively efficient and do not produce pollutants that have not yet found widespread use.

SUMMARY OF THE INVENTION

The present invention attains the foregoing and other objects by providing methods and apparatus for more efficiently operating an energy system that employs an electrochemical converter. According to the invention, an electrochemical converter, such as a fuel cell, is combined with a cogeneration or bottoming device that extracts energy from the waste heat produced by the fuel cell. The electrochemical converter and the bottoming device form an improved energy system for converting fuel into useful forms of electrical, mechanical, or thermal energy. Devices that may be combined with a fuel cell include gas turbines, steam turbines, thermal fluid boilers, and heat-actuated chillers. The latter two devices are often incorporated in a Heating Ventilation and Cooling (HVAC) system.

According to one aspect of the invention, an electrochemical converter is disposed within a positive pressure vessel that is adapted for collecting heated exhaust gases produced by the electrochemical converter. At least a portion of the exhaust gases generated by the electrochemicaL verter are exhausted into the interior of the pressure vessel for collection by the vessel, and the pressure vessel includes an exhaust element for routing the collected gases to a bottoming device. The positive pressure vessel allows the exhaust gases generated by the electrochemical converter to be collected at temperatures and pressures suited for the extraction of energy by bottoming devices. Such devices include, but are not limited to, a gas turbine, a thermal fluid boiler, a steam boiler, and a heat-actuated chiller. Thus the invention facilitates the integration of a electrochemical converter, such as a fuel cell array, with bottoming devices.

The term "positive pressure vessel" is intended to include a vessel designed to operate at pressures such as 1 or 2 atmospheres, or a vessel designed to tolerate much higher pressures, up to 1000 psi. A lower pressure vessel is useful when the bottoming device used in conjunction with the electrochemical converter is, for example, an HVAC system that incorporates a heat-actuated chiller or a boiler. A higher pressure vessel is useful, for example, with a gas turbine.

According to another aspect of the invention, a pump mechanism pumps at least one of the input reactants into the electrochemical converter such that pressurized exhaust exits the converter and pressurizes the interior of the pressure vessel. In one aspect of the invention, the pump can be the compressor of a gas turbine, and the pressure vessel and electrochemical converter enclosed therein function as a combustor for the turbine. The exhaust gases collected by the pressure vessel are delivered to, and drive, the turbine. The turbine may be coupled to an electric generator to produce electric energy in addition to that produced directly by the electrochemical converter.

Alternatively, in a different aspect of the invention, the above-mentioned pump can be a blower that pressurizes the interior of the pressure vessel for optimum delivery of the exhaust gases to the heating element, such as a thermal fluid or steam boiler, or the cooling element, such as a heat-actuated chiller, of an HVAC system.

In yet a further aspect of the invention, the energy system of the invention includes a regenerative heat exchanging element, such as a cooling jacket, in thermal communication with a pressure vessel, for maintaining the exterior of the vessel at a selected temperature. A heat exchanging fluid is circulated through the cooling jacket, typically by a pump. According to this feature of the invention, the regenerative heat exchanger cools the exterior of the pressure vessel.

According to another feature of the invention, reactants, such as those supplied to the fuel cell array or reactant processors, are passed through the cooling jacket of the pressure vessel prior to their introduction to the electrochemical converter. These reactants are preheated by the heat exchanger prior to introduction to a fuel cell or reactant processor.

In yet another aspect, the reactants are drawn through the heat exchanging element by a drawing pump, and the outlet of the pump supplies the reactant to a fuel cell or reactant processor. Significantly, the drawing pump can be the compressor of a gas turbine that also extracts energy from the waste heat from the converter. The inlet of the compressor is in fluid communication with the heat exchanging element to draw a reactant, such as air, through the heat exchanging elements. The outlet of the compressor is in fluid communication with the fuel cell array, or with a reactant processor, for supplying the heated reactant thereto. The pressurized exhaust gases are collected by the pressure vessel and supplied to the gas turbine.

In another aspect of the invention, the input reactant is blown, or in an alternative embodiment drawn, through the heat exchanging element by a blower. The blower provides a slight pressurization of vessel to facilitate collection and delivery of the electrochemical converter exhaust gases to a bottoming device, such as a HVAC system, that can include a heat actuated chiller and/or a boiler.

Both the compressor, which is typically used with a turbine, and the blower, pressurize the vessel by forcing input reactant into, and hence exhaust products out of, the electrochemical converter, which exhausts to the interior of the vessel. Because the blower does not significantly heat the reactants, it can be arranged to blow, rather than draw, a heat exchanging fluid comprising an input reactant or reactants through the heat exchanging element for cooling the vessel.

The invention provides a simplified electrochemical converter power system with enhanced efficiency by providing a pressure vessel for the collection of exhaust gases and by minimizing the need for an independent cooling system for cooling the exterior of the pressure vessel. Such an independent system would typically include a pump, cooling fluid, and a radiator dedicated solely to removing heat from the pressure vessel heat exchanger. The invention employs an input reactant as the cooling fluid, eliminating the need for dedicated cooling fluid. In addition, waste heat is introduced to the input reactant stream, eliminating the need for a separate heat exchanger and reintroducing waste heat to the converter assembly, thus boosting efficiency. The input reactant can be drawn through the pressure vessel heat exchanging element by the compressor, or blown through by an air blower, thus eliminating the need for a separate pump to circulate the heat exchanging fluid.

In yet another aspect of the invention, the heat exchanger of the present invention is a tubular coil, in thermal communication with the pressure vessel, and having an interior lumen. The heat exchanging fluid flows through the inner lumen of the tubular coil. In another variation of the present invention, the heat exchanger includes a porous structure, and the pressure vessel transpirationally exchanges heat as the heat exchanging fluid flows through the pores of the wall. One of ordinary skill in the art, based on the disclosures herein, can envision other heat exchangers useful for exchanging heat with the pressure vessel. See for example, Internal Thermal Integration (ITI), described in U.S. Pat. No. 5,501,781, herein incorporated by reference, and Radiant Thermal Integration, (RTI) described in U.S. Pat. No. 5,462,817, herein incorporated by reference. Additional thermal control systems employing isothermal heat exchangers are disclosed in U.S. Pat. No. 5,338,622, also herein incorporated by reference. Modification of such techniques for the exchange of heat with the pressure vessel, in accordance with the disclosure herein, is considered within the scope of the invention.

In yet another aspect of the invention, feedthroughs are provided for ducting reactants from the outside of the pressure vessel to the electrochemical fuel cell array disposed within the pressure vessel and vice versa. Similarly, feedthroughs are provided for making electrical connections to the electrochemical converter array, and for exhausting exhaust products generated by the electrochemical converter array. The feedthroughs for handling the reactants are adapted to provide a transition from a high pressure, high temperature environment within the pressure vessel to an environment exterior to the pressure vessel.

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

Figure 1:
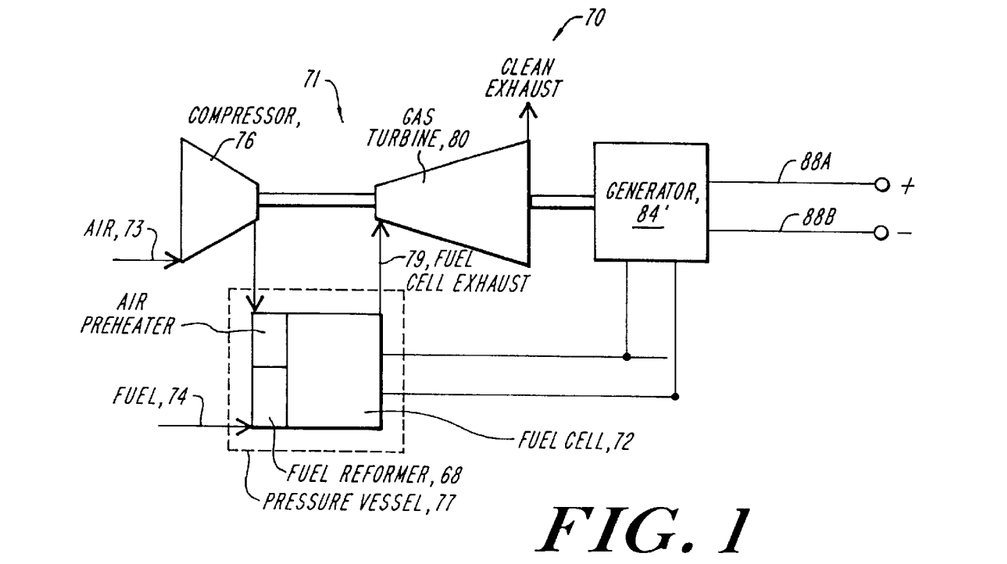
FIG. 1 is a schematic block diagram of one embodiment of an energy system employing an electrochemical converter and a gas turbine according to the present invention.

FIG. 1 shows an energy system incorporating an electrochemical converter and a gas turbine according to the present invention. The illustrated energy system 70 includes an electrochemical converter 72 and a gas turbine assembly 71.

The gas turbine assembly 71 includes a compressor 76, a turbine expander 80, and a generator 84. Air from air source 73 is introduced to the compressor 76, by way of any suitable conduit, where it is compressed, heated in the air preheater 69 and discharged and introduced to the electrochemical converter 72. The fuel 74 is introduced to a reformer 68 where it is reformed, as is known in the art, and is then directed to the electrochemical converter 72. The heated air and fuel function as input reactants and power the electrochemical converter 72.

The converter 72 receives the compressed air introduced by the compressor 76, and the fuel 74, thermally disassociating it in the reformer 68 into constituent non-complex reaction species, typically $H_2$ and CO, before using the fuel and air to produce electrical power and a high temperature exhaust. The exhaust is introduced to the interior of a pressure vessel 77, which collects and routes the exhaust 79 to the gas turbine expander 80, which converts this thermal energy into rotary energy, for subsequent transfer to an electric generator 84. The generator 84 produces electricity that can be used for both industrial and residential purposes. The converter 72 functions as an additional electric generator, and the illustrated electrical connections 88A and 88B show that electricity can be extracted from both the generator 84 and the converter 72. The gas turbine assembly 71 components and the generator 84 are known and commercially available. Those of ordinary skill will readily understand the integration of the electrochemical converter 72 and the gas turbine assembly 71, in light of the present description and illustrations.

Figure 2:
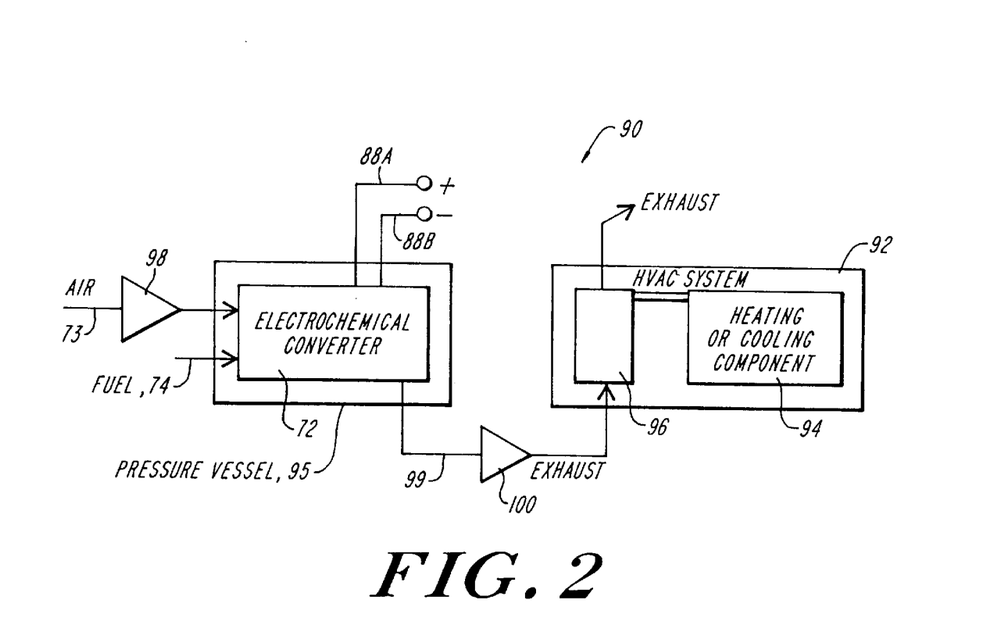
FIG. 2 is a schematic block diagram of another embodiment of an energy system employing an electrochemical converter, such as a fuel cell, thermally coupled with a heating or cooling component of an HVAC system.

FIG. 2 shows a total energy system 90 incorporating an electrochemical converter and an Heating, Ventilation, and Cooling (HVAC) system. The total energy system 90, in addition to producing electricity, conditions, e.g., heats or cools, a selected fluid. The illustrated total energy system 90 includes an electrochemical converter 72 that is thermally coupled to an HVAC system 92. The electrochemical converter 72, in addition to generating electricity, produces waste heat which is transferred, either radiatively, convectively, or conductively, to the HVAC system 92. The electrochemical converter 72 shown in FIG. 2 is convectively coupled to the HVAC system 92.

HVAC systems, such as the illustrated HVAC system 92, commonly utilize a closed loop system for transferring a heat transfer fluid throughout a building or an industrial facility. In such a closed loop system, a heating component, such as a steam boiler or a thermal fluid boiler, or a cooling component, such as a heat actuated chiller or other air conditioning component, conditions the heat transfer fluid, which is typically conveyed throughout the facility via fluid conduits. HVAC systems are commonly used for controlling the ambient environmental conditions, such as temperature or humidity, in one or a plurality of structurally enclosed facilities. According to one common practice, a plurality of HVAC systems can be installed within a single facility and are connected in a suitable network which is serviced by a common thermal source, which may include either a heating component or a cooling component, or both. The heating and cooling components provide the thermal energy required to heat or cool the facility.

The illustrated electrochemical converter 72, e.g., a fuel cell, has a fuel reactant input 74 and an air reactant input 73. The fuel and oxidizer reactants are introduced to the illustrated electrochemical converter 72 by way of appropriate manifolding. The electrochemical converter processes the fuel and oxidizer reactants, 74 and 73, respectively, and generates, in one mode of operation, electricity and waste heat.

As shown, the illustrated electrochemical converter 72 produces exhaust 99 containing waste heat, which is delivered from the electrochemical converter 72 to the interior of a pressure vessel 95 disposed about the electrochemical converter 72. The pressure vessel 95 collects the exhaust 99 and delivers it to the thermal process element 96 for use with the heating or cooling component 94 of the HVAC system 92, convectively integrating the converter 72 with the HVAC system 92. The thermal process element 96 can include, for example, a convective heat exchanger that is geometrically matched to a vapor generator (not shown) of a heat-actuated chiller, such that the convective heat exchanger absorbs heat from the exhaust 99 and transfers the heat to the vapor generator. The vapor generator can be in the shape of an annulus, and the convective heat exchanger can be positioned in the center of the annulus. After exiting the thermal process element 96, the exhaust is then ducted away from the system.

A blower 98 can be employed to pump an input reactant, such as the air input reactant 73, into the electrochemical converter 72 and to produce a higher pressure flow of exhaust 99 within the pressure vessel 95 and hence delivered to the HVAC system 92. Alternatively, a drawing pump 100 can draw exhaust gases 99 from the electrochemical converter 72 and pressure vessel 95 for supply to the HVAC system 92. The pressure vessel 95 used with energy system illustrated in FIG. 2 is typically designed to operate at lower pressure than the pressure vessel 77 illustrated in FIG. 1.

Energy systems, such as those illustrated in FIGS. 1 and 2, can achieve high efficiency by the direct integration of a compact electrochemical converter with bottoming plant components. For example, the integration of the electrochemical converter with a gas turbine in the manner illustrated in FIGS. 1 produces a hybrid power system that has an overall power efficiency of nearly about 70%. This system efficiency represents a significant increase over the efficiencies achieved by conventional gas turbine systems and prior art electrochemical systems. The electrochemical converter 72 also operates as a low NOx thermal source, thereby improving environmental performance relative to a conventional gas turbine generating system.

The electrochemical converter of the present invention is preferably a fuel cell, such as a solid oxide fuel cell, a molten carbonate fuel cell, a phosphoric acid fuel cell, an alkaline fuel cell or a proton exchange membrane fuel cell. Electrochemical converters, such as fuel cells, are known in the art, and are shown and described in U.S. Pat. No. 5,462,817 of Hsu, U.S. Pat. No. 5,501,781 of Hsu, and 4,853,100 of Hsu, all of which are hereby incorporated by reference.

The above discussion is illustrative of energy systems that employ electrochemical converters disposed within a pressure vessel for collection of exhaust gases that are then delivered to bottoming devices to realize a higher efficiency energy system. The above illustration of FIGS. 1 and 2 are not intended to be limiting; additional energy systems can be used in accord with the teachings of the present invention. For example, U.S. Pat. No. 5,501,781 of Hsu et. al. and U.S. Pat. No. 6,462,817 of Hsu disclose energy systems employing an electrochemical converter and a steam generator, amongst other energy systems.

As noted above, the electrochemical converters useful with the present invention include fuel cells. Fuel cells typically utilize the chemical potential of selected fuel species, such as hydrogen or carbon monoxide molecules, to produce oxidized molecules in addition to electrical power. Because the cost of supplying molecular hydrogen or carbon monoxide is relatively higher than providing traditional fossil fuels, a fuel processing or reforming step can be utilized to convert the fossil fuels, such as coal and natural gas, to a reactant gas mixture high in hydrogen and carbon monoxide. Consequently, a fuel processor, either dedicated or disposed internally within the fuel cell, is employed to reform, by the use of steam, oxygen, or carbon dioxide (in an endothermic reaction), the fossil fuels into non-complex reactant gases.

Figure 3:
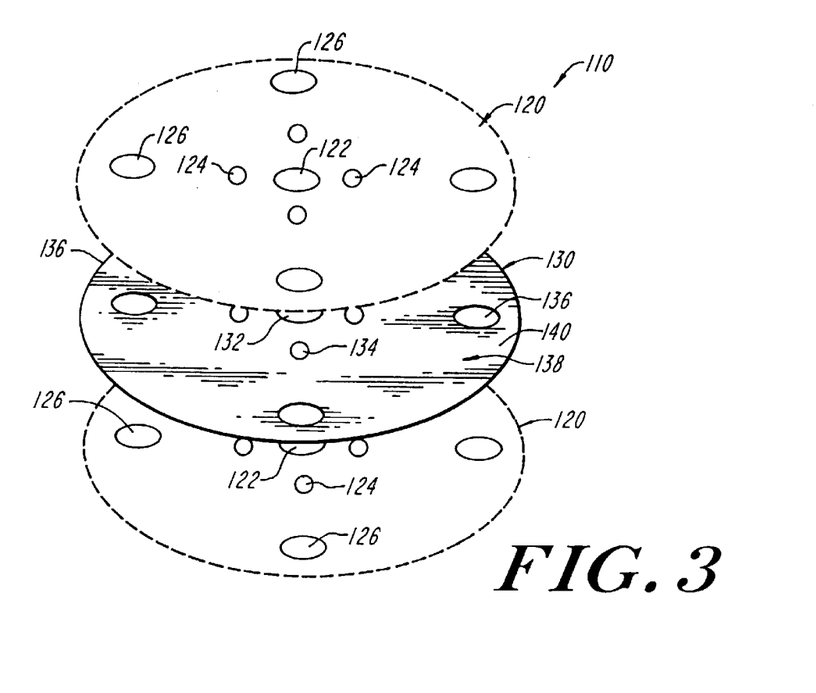
FIG. 3 is a perspective view of a basic cell unit of an electrochemical converter useful with the present invention.
Figure 4:
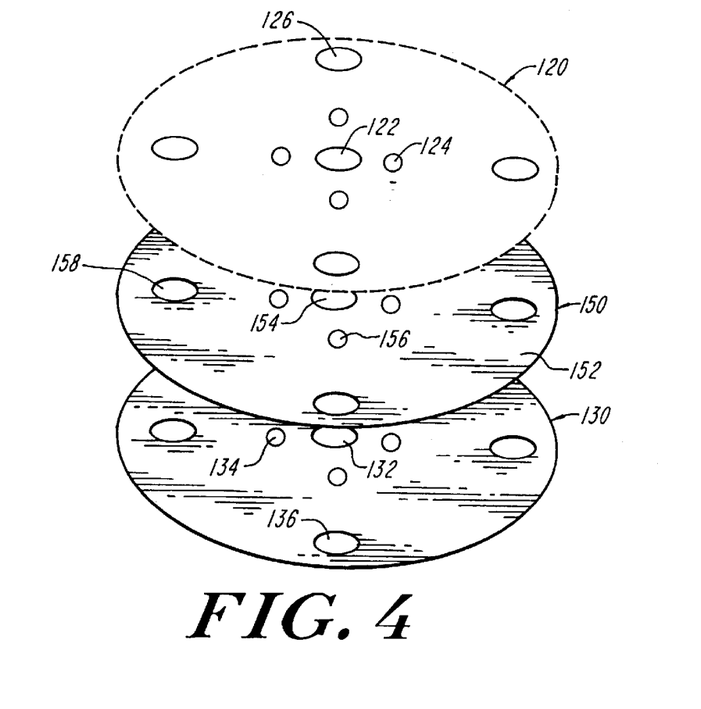
FIG. 4 is a perspective view of an alternate embodiment of the basic cell unit of the electrochemical converter of the present invention.
Figure 5:
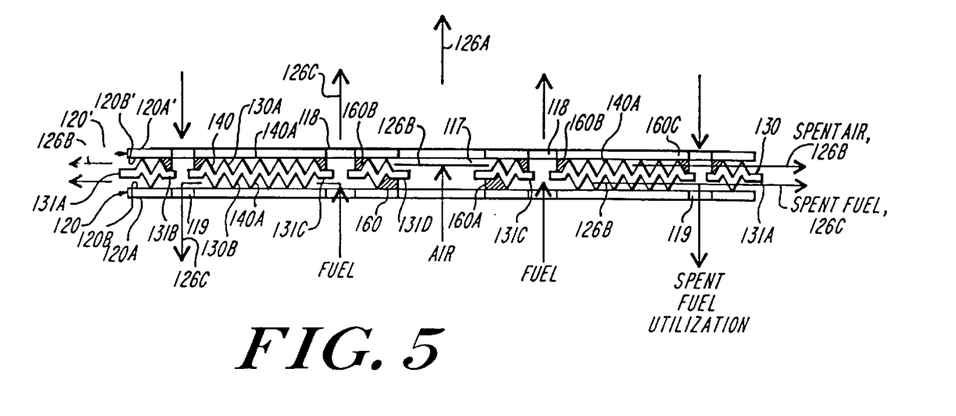
FIG. 5 is a cross-sectional view of the cell unit of FIG. 3.

FIGS. 3–5 illustrate, as an example, the basic cell unit 110 of the electrochemical converter 72, which is particularly suitable for integration with conventional gas turbines. The cell unit 110 includes an electrolyte plate 120 and an interconnector plate 130. The electrolyte plate 120 can be made of a ceramic, such as a stabilized zirconia material $ZrO_2(Y_2O_3)$, on which a porous oxidizer electrode material 120A and a porous fuel electrode material 120B are disposed thereon. Exemplary materials for the oxidizer electrode material are perovskite materials, such as $LaMnO_3(Sr)$. Exemplary materials for the fuel electrode material are cermets such as $ZrO_2/Ni$ and $ZrO_2/NiO$.

The interconnector plate 130 preferably is made of an electrically and thermally conductive interconnect material. Examples of such material include nickel alloys, platinum alloys, non-metal conductors such as silicon carbide, $La(Mn)CrO_3$, and preferably commercially available Inconel, manufactured by Inco., U.S.A. The interconnector plate 130 serves as the electric connector between adjacent electrolyte plates and as a partition between the fuel and oxidizer reactants. As best shown in FIG. 4, the interconnector plate 130 has a central aperture 132 and a set of intermediate, concentric radially outwardly spaced apertures 134. A third outer set of apertures 136 are disposed along the outer cylindrical portion or periphery of the plate 130.

The interconnector plate 130 has a textured surface 138. The textured surface preferably has formed thereon a series of dimples 140, as shown in FIG. 4, which form a series of connecting reactant-flow passageways. Preferably, both sides of the interconnector plate 130 have the dimpled surface formed thereon. Although the intermediate and outer set of apertures 134 and 136, respectively, are shown with a selected number of apertures, those of ordinary skill will recognize that any number of apertures or distribution patterns can be employed, depending upon the system and reactant-flow requirements.

Likewise, the electrolyte plate 120 has a central aperture 122, and a set of intermediate and outer apertures 124 and 126 that are formed at locations complementary to the apertures 132, 134 and 136, respectively, of the interconnector plate 130.

Referring to FIG. 4, a spacer plate 150 can be interposed between the electrolyte plate 120 and the interconnector plate 130. The spacer plate 150 preferably has a corrugated surface 152 that forms a series of connecting reactant-flow passageways, similar to the interconnecting plate 130. The spacer plate 150 also has a number of concentric apertures 154, 156, and 158 that are at locations complementary to the apertures of the interconnect and electrolyte plates, as shown. Further, in this arrangement, the interconnector plate 130 is devoid of reactant-flow passageways. The spacer plate 150 is preferably made of an electrically conductive material, such as nickel.

The illustrated electrolyte plates 120, interconnector plates 130, and spacer plates 150 can have any desirable geometric configuration. Furthermore, the plates having the illustrated manifolds can extend outwardly in repetitive or non-repetitive patterns, and thus are shown in dashed lines.

Referring to FIG. 5, when the electrolyte plates 120 and the interconnector plates 130 are alternately stacked and aligned along their respective apertures, the apertures form axial (with respect to the stack) manifolds that feed the cell unit with the input reactants and that exhaust spent fuel. In particular, the aligned central apertures 122, 132, 122 of FIGS. 3 and 4 form input oxidizer manifold 117, the aligned concentric apertures 124, 134, 124 of FIGS. 3 and 4 form input fuel manifold 118, and the aligned outer apertures 126, 136, 126 of FIGS. 3 and 4 form spent fuel manifold 119.

The dimpled surface 138 of the interconnector plate 130 has, in the cross-sectional view of FIG. 5, a substantially corrugated pattern formed on both sides. This corrugated pattern forms the reactant-flow passageways that channel the input reactants towards the periphery of the interconnector plates. The interconnector plate also has an extended heating surface or lip structure that extends within each axial manifold and about the periphery of the interconnector plate. Specifically, the interconnector plate 130 has a flat annular extended surface 131A formed along its outer peripheral edge. In a preferred embodiment, the illustrated heating surface 131A extends beyond the outer peripheral edge of the electrolyte plate 120. The interconnector plate further has an extended heating surface that extends within the axial manifolds, for example, edge 131B extends into and is housed within the axial manifold 119; edge 131C extends into and is housed within the axial manifold 118; and edge 131D extends into and is housed within the axial manifold 117. The extended heating surfaces can be integrally formed with the interconnector plate or can be coupled or attached thereto. The heating surface need not be made of the same material as the interconnector plate, but can comprise any suitable thermally conductive material that is capable of withstanding the operating temperature of the electrochemical converter. In an alternate embodiment, the extended heating surface can be integrally formed with or coupled to the spacer plate.

The absence of a ridge or other raised structure at the interconnector plate periphery provides for exhaust ports that communicate with the external environment. The reactant-flow passageways connect, fluidwise, the input reactant manifolds with the outer periphery, thus allowing the reactants to be exhausted to the external environment, or to a thermal container or pressure vessel disposed about the electrochemical converter, as discussed below.

Referring again to FIG. 5, the illustrated sealer material 160 can be applied to portions of the interconnector plate 130 at the manifold junctions, thus allowing selectively a particular input reactant to flow across the interconnector surface and across the mating surface of the electrolyte plate 120. The interconnector plate bottom 130B contacts the fuel electrode coating 120B of the electrolyte plate 120. In this arrangement, it is desirable that the sealer material only allow fuel reactant to enter the reactant-flow passageway, and thus contact the fuel electrode.

As illustrated, the sealer material 160A is disposed about the input oxidizer manifold 117, forming an effective reactant flow barrier about the oxidizer manifold 117. The sealer material helps maintain the integrity of the fuel reactant contacting the fuel electrode side 120B of the electrolyte plate 120, as well as maintain the integrity of the spent fuel exhausted through the spent fuel manifold 119.

The top 130A of the interconnector plate 130 has the sealer material 160B disposed about the fuel input manifolds 118 and the spent fuel manifold 119. The top of the interconnector plate 130A contacts the oxidizer coating 120B' of an opposing electrolyte plate 120'. Consequently, the junction at the input oxidizer manifold 117 is devoid of sealer material, thereby allowing the oxidizer reactant to enter the reactant-flow passageways. The sealer material 160B that completely surrounds the fuel manifolds 118 inhibits the excessive leakage of the fuel reactant into the reactant-flow passageways, thus inhibiting the mixture of the fuel and oxidizer reactants. Similarly, the sealer material 160C that completely surrounds the spent fuel manifold 119 inhibits the flow of spent oxidizer reactant into the spent fuel manifold 119. Hence, the purity of the spent fuel that is pumped through the manifold 119 is maintained.

Referring again to FIG. 5, the oxidizer reactant can be introduced to the electrochemical converter through axial manifold 117 that is formed by the apertures 122, 132, and 122' of the electrolyte and interconnector plates, respectively. The oxidizer is distributed over the top of the interconnector plate 130A, and over the oxidizer electrode surface 120A' by the reactant-flow passageways. The spent oxidizer then flows radially outward toward the peripheral edge 131A, and is finally discharged along the converter element periphery. The sealer material 160C inhibits the flow of oxidizer into the spent fuel manifold 119. The flow path of the oxidizer through the axial manifolds is depicted by solid black arrows 126A, and through the oxidizer cell unit by the solid black arrows 126B.

The fuel reactant is introduced to the electrochemical converter 110 by way of fuel manifold 118 formed by the aligned apertures 124, 134, and 124' of the plates. The fuel is introduced to the reactant-flow passageways and is distributed over the bottom of the interconnector plate 130B, and over the fuel electrode coating 120B of the electrolyte plate 120. Concomitantly, the sealer material 160A, prevents the input oxidizer reactant from entering the reactant-flow passageways and thus mixing with the pure fuel/spent fuel reactant mixture. The absence of any sealer material at the spent fuel manifold 119 allows spent fuel to enter the manifold 119. The fuel is subsequently discharged along the annular edge 131A of the interconnector plate 130. The flow path of the fuel reactant is illustrated by the solid black arrows 126C.

The dimples 140 of the interconnector surface have an apex 140A that contact the electrolyte plates, in assembly, to establish an electrical connection therebetween.

A wide variety of conductive materials can be used for the thin interconnector plates of this invention. Such materials should meet the following requirements: (1) high strength, as well as electrical and thermal conductivity; (2) good oxidation resistance up to the working temperature; (3) chemical compatibility and stability with the input reactants; and (4) manufacturing economy when formed into the textured plate configuration exemplified by reactant-flow passageways.

Materials suitable for the fabrication of interconnector plates include nickel alloys, nickel-chromium alloys, nickel-chromium-iron alloys, iron-chromium-aluminum alloys, platinum alloys, cermets of such alloys and refractory material such as zirconia or alumina, silicon carbide and molybdenum disilicide.

The textured patterns of the top and bottom of the interconnector plate can be obtained, for example, by stamping the metallic alloy sheets with one or more sets of matched male and female dies. The dies are preferably prefabricated according to the desired configuration of the interconnector plate, and can be hardened by heat treatment to withstand the repetitive compressing actions and mass productions, as well as the high operating temperatures. The stamp forming process for the interconnectors is preferably conducted in multiple steps due to the geometrical complexity of the gas passage networks, e.g., the dimpled interconnector plate surface. The manifolds formed in the interconnector plates are preferably punched out at the final step. Temperature annealing is recommended between the consecutive steps to prevent the overstressing of sheet material. The stamping method is capable of producing articles of varied and complex geometry while maintaining uniform material thickness.

Alternatively, corrugated interconnectors can be formed by electro-deposition on an initially flat metal plate using a set of suitable masks. Silicon carbide interconnector plates can be formed by vapor deposition onto pre-shaped substrates, by sintering of bonded powders, or by self-bonding processes.

The oxidizer and fuel reactants are preferably preheated to a suitable temperature prior to entering the electrochemical converter. This preheating can be performed by any suitable heating structure, such as a regenerative heat exchanger or a radiative heat exchanger, for heating the reactants to a temperature sufficient to reduce the amount of thermal stress applied to the converter.

Another significant feature is that the extended heating surfaces 131D and 131C heat the reactants contained within the oxidizer and fuel manifolds 117 and 118 to the operating temperature of the converter. Specifically, the extended surface 131D that protrudes into the oxidizer manifold 117 heats the oxidizer reactant, and the extended surface 131C that protrudes into the fuel manifold 118 heats the fuel reactant. The highly thermally conductive interconnector plate 130 facilitates heating of the input reactants by conductively transferring heat from the fuel cell internal surface, e.g., the middle region of the conductive interconnector plate, to the extended surfaces or lip portions, thus heating the input reactants to the operating temperature prior to traveling through reactant flow passageways. The extended surfaces thus function as a heat fin. This reactant heating structure provides a compact converter that is capable of being integrated with an electricity generating power system, and further provides a highly efficient system that is relatively low in cost. Electrochemical converters incorporating fuel cell components constructed according to these principles and employed in conjunction with a gas turbine or an HVAC system provides a power system having a relatively simple system configuration.

The operating temperature of the electrochemical converter is preferably between about 20° C. and 1500° C., and the preferred fuel cell types employed by the present invention include solid oxide fuel cells, molten carbonate fuel cells, alkaline fuel cells, phosphoric acid fuel cells, and proton membrane fuel cells.

FIGS. 3–5 illustrate interleaved plates that can be arranged to form a fuel cell stack. However, the present invention is useful not only with a stack-type fuel cell, but with many other types of fuel cells known in the art. For example a fuel cell element need not be a stack; that is, it need not be constructed as a stack of interleaved plates, but can have, for example, a tubular configuration. Such a tubular fuel cell element, or other shapes, known by those of ordinary skill in the art to be useful, based on the disclosure herein, in the present invention, are deemed within the scope of the invention.

Figure 6:
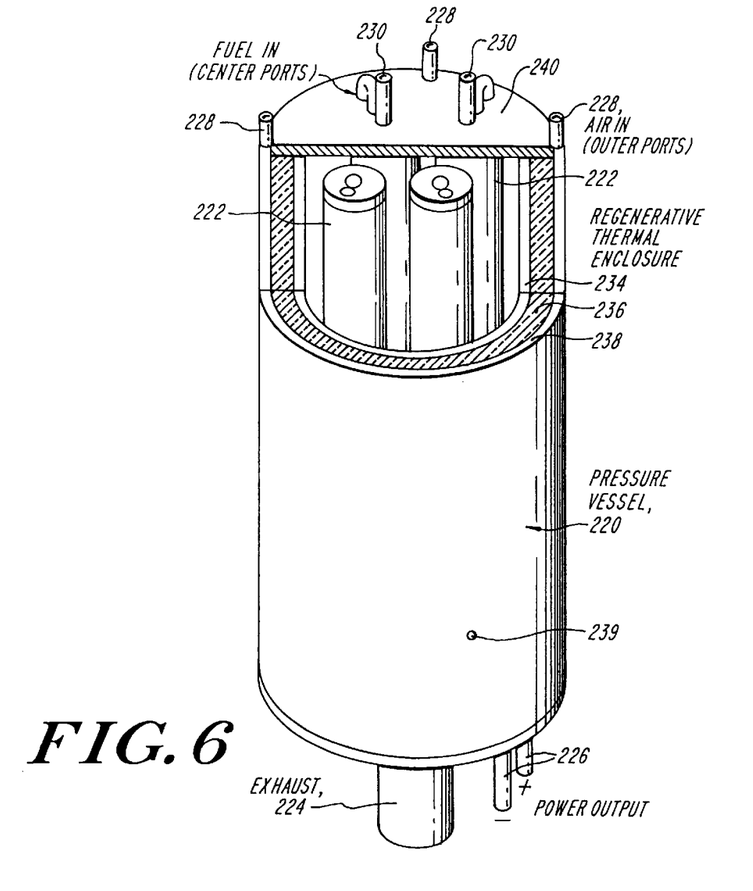
FIG. 6 is a plan view, partially cut-away, of a pressure vessel enclosing a series of electrochemical converters of the present invention.

According to the invention, the integration of an electrochemical converter with a bottoming device, such as the gas turbine illustrated in FIG. 1 or the HVAC system illustrated in FIG. 2, is aided by housing the electrochemical converter 72 within a pressure vessel. A preferred type of converter pressure vessel is illustrated in FIG. 6, where a pressure vessel 220, which can also function as a regenerative thermal enclosure, encases a series of stacked fuel cell assemblies 222. The pressure vessel 220 includes an exhaust outlet manifold 224 for routing gases collected by the pressure vessel 220 to a bottoming device, electrical connectors 226 and input reactant manifolds 228 and 230. In a preferred embodiment, the fuel reactant is introduced to the fuel cell stacks 222 through the centrally located manifolds 230, and the oxidizer reactant is introduced through the manifolds 228 located about the periphery of the vessel 220.

The stacked fuel cell array 222 can vent exhaust gases to the interior of the pressure vessel 220. The pressure of exhaust gases appropriate to the bottoming device used in conjunction with the pressure vessel can be controlled through use of a pump, such as the compressor 76 in FIG. 1, or the blower 98 in FIG. 2, selectively pumping an input reactant into, and hence exhaust gases out of, the electrochemical converter array 222.

As described above, the electrochemical converter can be operated at an elevated temperature and at ambient pressure or slightly above, as when the energy system employs an HVAC system as the bottoming device, or at an elevated pressure, as when the energy system employs a gas turbine, and wherein the pressure vessel and electrochemical converter acts as the combustor of the gas turbine system. The electrochemical converter is preferably a fuel cell system that can also include an interdigitated heat exchanger, similar to the type shown and described in U.S. Pat. No. 4,853,100, which is herein incorporated by reference.

The pressure vessel 220 can include an outer wall 238 spaced from an inner wall 234, thereby creating an annulus 236 therebetween. The annulus 236 can be filled with an insulative material for maintaining the outer surface 239 of the pressure vessel 220 at an appropriate temperature. Alternatively, the annulus can house or form a heat exchanging element for exchanging heat with the pressure vessel 220. In one embodiment of a heat exchanger, the annulus 236 and walls 234 and 238 can form a heat exchanging jacket for circulating a heat exchanging fluid therein. The heat exchanger formed by the walls 234 and 238 and the annulus 236 exchanges heat with the pressure vessel and helps maintain the outer surface 239 of the pressure vessel at an appropriate temperature. Of course the use of the annulus 236 as a cooling jacket does not preclude the additional use of an insulative material, located other than in the annulus 236, for reducing heat loss from the interior of the pressure vessel 220 or for also helping to maintain the outer surface 239 of the pressure vessel at an appropriate temperature.

In one embodiment of the invention, the heat exchanging fluid circulated in the pressure vessel heat exchanger, such as the cooling jacket formed by walls 234 and 238 and annulus 236, is an input reactant, such as the air input reactant flowing in the manifolds 238. In this embodiment, the manifolds 228 are essentially inlets that are in fluid communication with the portion of the annulus 236 adjacent the top 240 of the pressure vessel 220. Additional manifolding (not shown) fluidly connects the annulus 236 to the fuel cell stack 222 such that the air input reactant is properly introduced thereto. The preheating of the air input reactant by the cooling jacket formed by walls 234 and 238 and annulus 236 serves several purposes, including preheating the air input reactant to boost efficiency by regeneratively capturing waste heat, and cooling the outer surface 239 of the pressure vessel 220.

Figure 7:
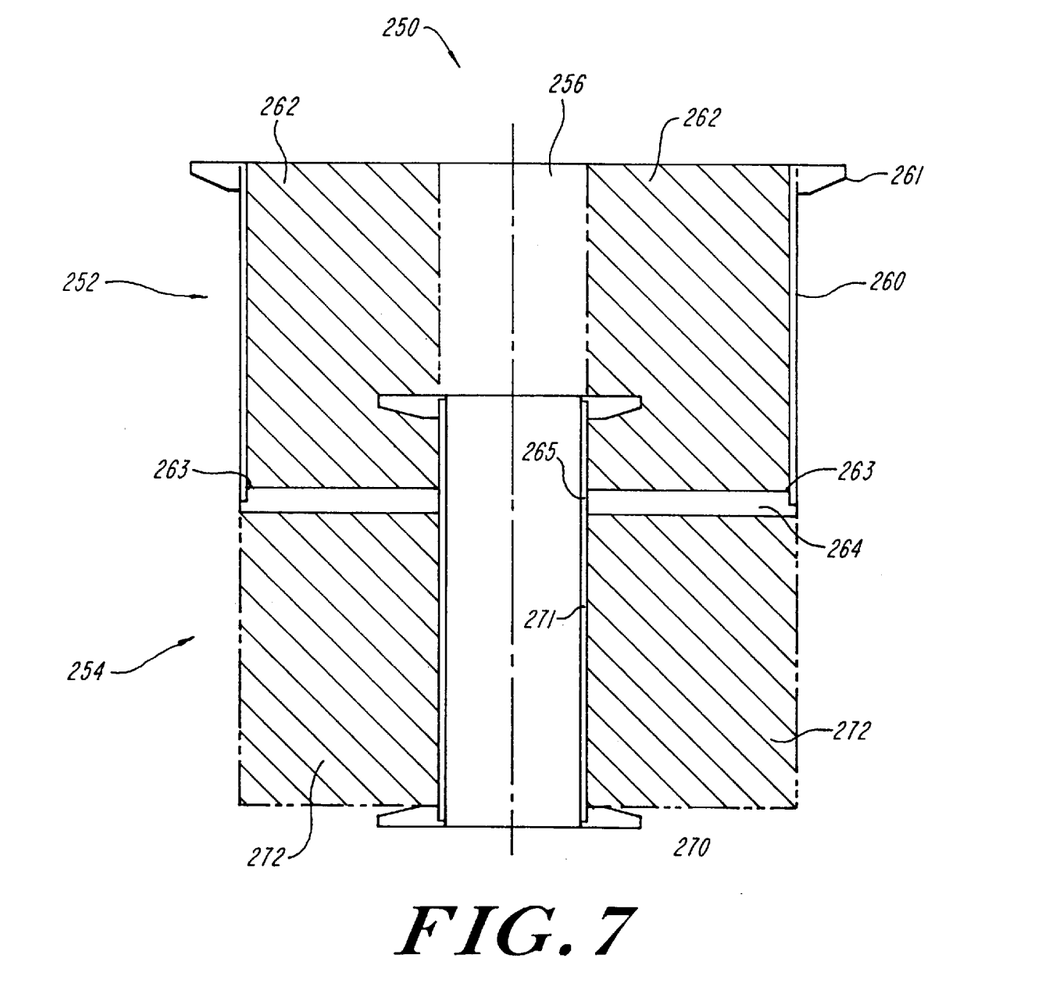
FIG. 7 is a cross section of a feedthrough for use with the pressure vessel of FIG. 6.

FIG. 7 illustrates a transition, or feedthrough, for use with the pressure vessel of the electrochemical converter power system, for ducting exhaust gases from the interior of the pressure vessel through a conduit for transfer to a bottoming device.

The feedthrough 250, shown in FIG. 7, is designed to operate at both high temperature and pressures, and includes an upper section 252, for attachment to the pressure vessel 220, and a lower section 254. An axial bore 256 passes through both the upper section 252 and the lower section 254 for ducting, or transferring, a fluid, such as exhaust gas, from the interior of the pressure vessel 220 to an appropriate conduit for transfer of the exhaust gas to a bottoming device.

The feedthrough upper section 252 includes an outer pressure tube, or jacket, 260 having a flange 261 attached thereto for mating with a flange (not shown) of the pressure vessel 220. An annulus of thermal insulation material 262 is disposed inside the tube 260. The pressure tube 260 terminates at a pressure disc, or cap, 264. The pressure disc can be welded at the joint 263 to the outer pressure tube 260. The pressure disc can be welded at the joint 265 to the outer wall of an inner pressure tube 271.

The lower section 254 of the feedthrough 250 includes the inner pressure tube 271 having a lower flange 270 for attachment to a conduit (not shown). The inner tube 271 is attached, as noted above, at the joint 265 to the pressure cap 264. The pressure cap 264 thus forms a pressure tight joint between the tubes 260 and 271. An annulus of insulation 272 is disposed about the tube 271.

The upper section 252 of the feedthrough 250 thus transitions from an annulus of insulation 262 that is interior to the outer tube 260 to an annulus of insulation 272 that jackets the exterior of the inner pressure tube 271. The tube 271 has a small diameter for ease of connection with conduit.

Figure 8:
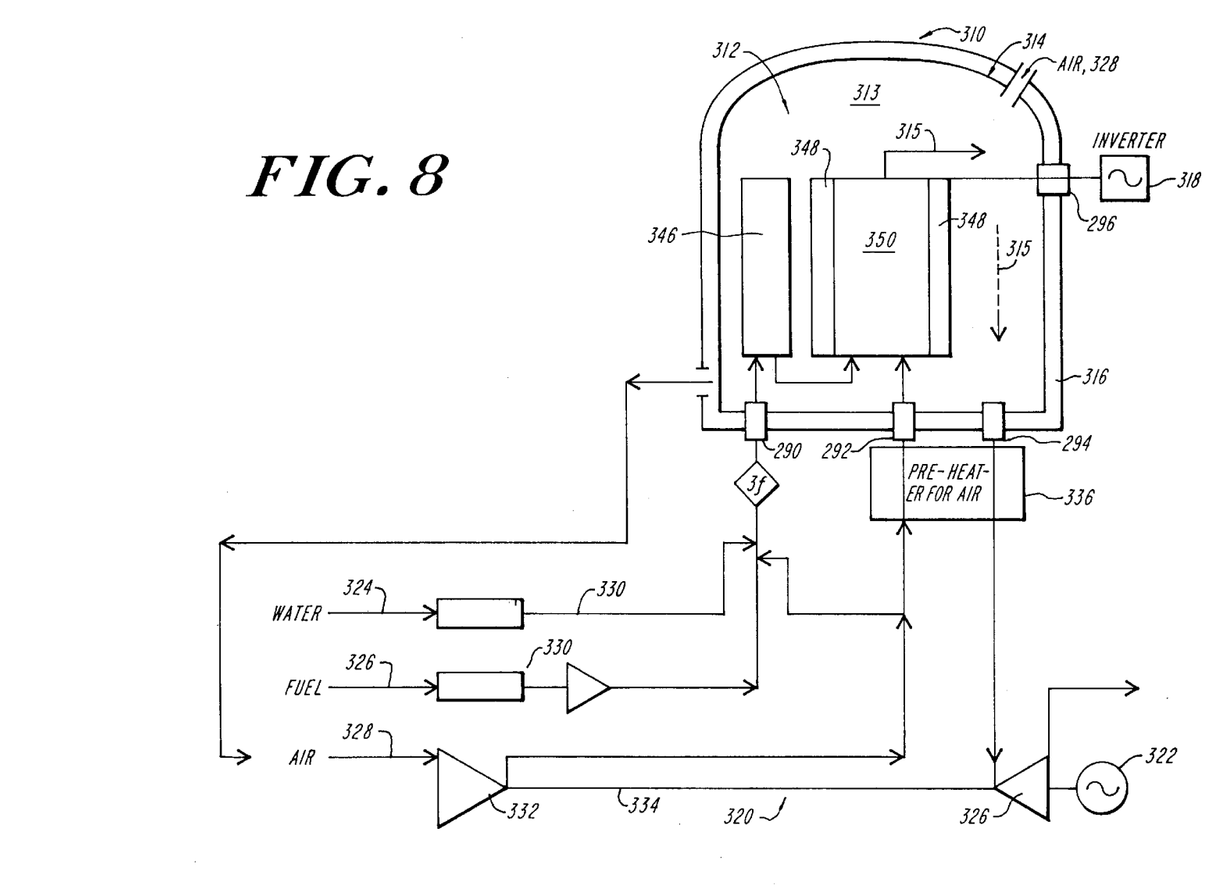
FIG. 8 is a schematic illustration of an energy system incorporating an electrochemical converter disposed within a pressure vessel, a pressure vessel heat exchanger, and a gas turbine system for extracting energy from exhaust gases generated by the converter.

FIG. 8 illustrates an energy system 310, in which an electrochemical converter 312 is enclosed in a pressure vessel 314 having a heat exchanging element 316, such as a cooling jacket 316. The bottoming device incorporated in the illustrated energy system 310 is a gas turbine 320, which extracts mechanical energy from waste heat in exhaust gases 315 generated by the electrochemical converter 312. Other bottoming devices are possible, as discussed above.

The pressure vessel 314 can be regeneratively cooled by an oxidizer reactant 328, such as oxygen, or by other input reactants, such as water 324, flowing in the heat exchanging element 316, such as the illustrated cooling jacket, or in a cooling coil. One of ordinary skill in the art, in accordance with the teachings herein, will readily appreciate that the heat exchanging element 316 can have various configurations. For example, the pressure vessel 314 can also be transpirationally cooled by a heat transfer fluid, such as oxidizer reactant 328, using an inward flow through a porous structure (not shown) disposed about the pressure vessel 314. For an example of a transpirational cooling technique see U.S. Pat. No. 5,338,622 of Hsu et. al., issued Aug. 16, 1994 and entitled "Thermal Control Apparatus," the teachings of which are herein incorporated by reference. Alternatively, the heat exchanger element 316 can include a cooling coil, having an inner lumen through which the heat exchanging fluid flows, and which is disposed about the pressure vessel 314. In addition, a high temperature thermal blanket or cast can insulate the vessel either internally, externally, or both. Typically, the pressure vessel 314 is cooled and/or insulated such that the external temperature is less than about 250° F.

The energy system 310 of FIG. B can operate without the heat exchanging element 316, typically resulting in a higher temperature of the walls of the pressure vessel.

Electricity is generated by the energy system 310 in at least two ways. The electrochemical converter 312 is electrically connected to inverter 318 for converting the direct current electrical energy generated by the converter 312 into alternating current, and the turbine expander 326 of gas turbine assembly 320 drives a generator 322. The turbine expander 326 need not be used to generate electricity; its output could be coupled to devices other than the generator 322 to perform, for example, mechanical work, such as driving a shaft for an industrial process.

Input reactants to the electrochemical converter power system 310 can include, but are not limited to, a reforming agent 324, which can comprise water; a fuel reactant input 326, such as natural gas, and an oxidizer input reactant 328, such as air. Input reactants 324 and 326 can be pre-processed, according to techniques known to those of ordinary skill in the art, by pre-processing apparatus 330. Pre-processing apparatus can include, for example, a desulfurization unit for removing sulfur compounds, which can harm the electrochemical converter 312, from the input fuel 326, and a filter for filtering the reforming agent 324.

In the illustrated embodiment, a compressor 332 draws the oxidizer input reactant 328 through cooling jacket 316 and delivers the reactant 328 under pressure to the electrochemical converter assembly 312, thus pressurizing the assembly 312 and causing exhaust gases 315 to pressurize the interior 313 of pressure vessel 314. The electrochemical converter assembly 312 in conjunction with pressure vessel 314 thus act as a combustor, for the turbine expander 326 of the gas turbine assembly 320. The compressor 332 can driven by a shaft 334 connected to the turbine expander 326, or alternatively, can be driven by a separate power source (not shown).

In alternative embodiments not shown in FIG. 8, the oxidizer reactant 328 can be circulated through the cooling jacket 316 by a blower or pump prior to entering the electrochemical converter assembly 312. In this instance the exhaust 315 of the converter assembly 312 is usually routed to a heat actuated chiller, or a boiler, for use with an HVAC system.

A preheater 336, as is known in the art, can be employed to preheat input reactants to the electrochemical assembly 312 before their introduction to the assembly 312. In the illustrated embodiment, the preheater 336 preheats the oxidizer input reactant 328 after it leaves the compressor 332. The pre-heater 336 extracts energy from the exhaust gases 315 prior to or following the introduction of the exhaust gases 315 to the turbine expander 326 of the gas turbine assembly 320 in a regenerative fashion.

The electrochemical converter assembly 312 can include a reactant processor 346, such as a reformer, and temperature regulation apparatus 348, in addition to a fuel cell array 350. The temperature regulation apparatus 348 can include that disclosed in U.S. Pat. Nos. 5,338,622 and 5,462,817, both herein incorporated by reference. The fuel cell array 350 and the reformer 346 can also be constructed as stacks. The stacks of the fuel cell 350, reformer 346 and temperature regulation apparatus stacks 348 can perform several functions, including the following: heating the electrochemical converter 312 on start-up, preheating one or more of the input reactants 324, 326, and 328; preheating of the reactant processor 326; reforming an input reactant, such as the fuel 326, and heating and cooling for temperature regulation under steady state operation of the electrochemical converter assembly 312.

Temperature regulation of the electrochemical converter assembly 312 can be accomplished by using the temperature regulation apparatus 348 in a heating mode by allowing the fuel and oxidizer to combust internal and/or external to the temperature regulation apparatus 348. Temperature regulation can be accomplished under a cooling mode by allowing entry of only the oxidizer or other non-reacting gases, such as nitrogen, to the temperature regulation apparatus 348.

The temperature regulation apparatus 348 can be used as a heater to provide supplemental heat for maintaining a required operational temperature of the fuel cell arrays 350, or to heat the electrochemical converter apparatus 312 on startup. In some instances a an electrochemical converter assembly 312, e.g., of a power rating less than 10 kW, can require heating to maintain the proper operating temperature of 1000° C. Further regulation methods include thermally integrated recuperation of outgoing hot exhaust and insulating the electrochemical converter 312 or a portion thereof.

The reactant processor 346 can reform fuel, typically by receiving fuel and steam as input reactants 326 and 324, respectively, and yielding H2 and CO, which both then enter the fuel cell array 350, with which the reactant processor 346 is in fluid communication. Other reactions are possible. For example, the reactant processor 346 can receive fuel and oxidizer and yield $H_2$ and CO, or receive fuel and steam and $CO_2$ and yield $H_2$ and CO. Reactant processor 346 can be enclosed to channel the flow of reactants 324 and 326 or to control the mixture of reactants and resultants. The reforming agent is typically regulated in proportion to the fuel flow, considering agents such as steam flow, $O_2$, or the fuel exhaust, consisting of $H_2O$ and $CO_2$. The reactant processor 346 can be disposed outside the pressure vessel 314, as is known in the art, or not used at all.

The fuel cell array 350 can receive the oxidizer 328 and reformed fuel from the reactant processor 346 to permit performance of the electrochemical reaction. The fuel cell array 350, while producing electricity, releases heat which can be received by the temperature regulation apparatus 348. The fuel cell array 350 is typically designed to release fuel exhausts 315 to the interior 313 of the vessel 314, and the exhaust 315 can be collected for recycling in reforming use or for other commercial feedstocks.

The fuel cell array 350 can also be operated in a reverse electrolysis mode to consume electricity and to producing fuel species and oxidation species. Reverse electrolysis can require heating of the fuel cell array, such as by the temperature regulation apparatus 348.

The fuel cell array 350 typically comprises multiple columns of fuel cell stacks, each stack having electrolyte plates or electrochemical processing plates interleaved with and thermally conducting plates. The reactant processor 346, can also have stacks which can be interdigitally positioned among the stacks of the fuel cell array 350. The stacks of the reactants processor typically comprise chemical processing plates interleaved with thermally conducting plates. The reactants processor stacks and the fuel cell stacks can be positioned interdigitally in rectangular, hexagon, or octagon pattern to achieve even thermal distribution.

With the above arrangement, the reactant processor stacks 346 and the fuel cell stacks 350 are capable of reaching their individual isothermal states in the plane of the conducting plates. The reactant processor stacks 346 and the fuel cell stacks 350 are also capable of reaching their individual isothermal states in the axial direction of the stacks assisted by the uniform distribution of the reactants flows. Combining the above two techniques, the fuel cell stacks 350 are capable of reaching an isothermal state in the radial direction as well as in the axial direction of the stacks.

The reactants processor stacks, the fuel cell stacks and the temperature regulation stacks close to the walls of vessel 314 can be connected independently from the inner stack arrays, but be maintained at the same operation temperature as the inner arrays.

The pressure vessel 314 encloses at least the fuel cell array 350 and should withstand the maximum pressure for the operation of the electrochemical converter assembly 312. Although pressures can vary, typical design pressures range from 50–500 psi. A cylindrical vessel, designed to collect the hot exhaust products 315 of the electrochemical converter assembly 312 has designated ports, such as port 294. As noted, use of the pressure vessel 314 facilitates the collection of exhaust gases for efficient extraction of energy therefrom.

In one example, the vessel 314 encloses an electrochemical converter assembly 312 that includes a 25 kW Solid Oxide Fuel Cell (SOFC) as the fuel array 350 and has an internal diameter of approximately 24" and a height of 24", and an external diameter of 34" and a height of 36". Feedthroughs 290 and 292 for reactants, feedthrough 294 for exhaust, and feedthrough 296 for electricity are placed on the bottom plate, or otherwise disposed on the periphery of the enclosure vessel 314.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. An electrochemical converter power system, comprising an array of electrochemical converters for generating power, said array adapted for receiving input reactants, a pressure vessel disposed about said array of electrochemical converters, said pressure vessel collecting exhaust gases generated by said electrochemical converters during operation, means for exhausting said collected exhaust gases from said pressure vessel for use external thereto, and wherein said electrochemical converter includes at least one means selected from the group consisting of means for pre-heating the electrochemical converter, means for preheating an oxidizer input reactant, means for preheating a fuel input reactant, means for preheating a steam input reactant, reactant processor means for reforming at least one input reactant to produce a resultant, means for heating the electrochemical converter array for maintaining steady state operation of said array, means for cooling the electrochemical converter array for maintaining steady state operation of said array, and means for regulating the temperature of said electrochemical converter.

2. An electrochemical converter power system, comprising an array of electrochemical converters for generating power, said array adapted for receiving one or more input reactants, a pressure vessel disposed about said array of electrochemical converters, said pressure vessel collecting exhaust gases generated by said electrochemical converters during operation, means for exhausting said collected exhaust gases from said pressure vessel for use external thereto, and temperature regulation elements for receiving the input reactant for combustively heating said electrochemical converter.

3. An electrochemical converter power system, comprising an array of electrochemical converters for generating power, said array adapted for receiving input reactants, a pressure vessel disposed about said array of electrochemical converters, said pressure vessel collecting exhaust gases generated by said electrochemical converters during operation, means for exhausting said collected exhaust gases from said pressure vessel for use external thereto, and temperature regulation elements for receiving a non-combusting input reactant for cooling said electrochemical converters.

4. An electrochemical converter power system, comprising an array of electrochemical converters for generating power, said array adapted for receiving input reactants, a pressure vessel disposed about said array of electrochemical converters, said pressure vessel collecting exhaust gases generated by said electrochemical converters during operation, means for exhausting said collected exhaust gases from said pressure vessel for use external thereto, and means for regulating the temperature of one of said electrochemical converters to maintain a required operation temperature of said electrochemical converter array.

5. An electrochemical converter power system, comprising an array of electrochemical converters for generating power and adapted for receiving input reactants, wherein said electrochemical converter array includes multiple fuel cell elements, each said fuel cell element including electrolyte plates interleaved with thermally conducting plates, a pressure vessel disposed about said array of electrochemical converters, said pressure vessel collecting exhaust gases generated by said electrochemical converters during operation, means for exhausting said collected exhaust gases from said pressure vessel for use external thereto, and cooling elements adapted for receiving heat generated by said fuel cell elements.

6. An electrochemical converter power system, comprising an array of electrochemical converters for generating power, said array adapted for receiving input reactants, a pressure vessel disposed about said array of electrochemical converters, said pressure vessel collecting exhaust gases generated by said electrochemical converters when said converters are operating, means for exhausting said collected exhaust gases from said pressure vessel for use external thereto, a steam boiler, and means for introducing exhaust gases produced by said electrochemical converter array to said boiler for the generation of steam.

7. An electrochemical converter system for use with a bottoming device, comprising an electrochemical converter array adapted for receiving input reactants;

a positive pressure vessel disposed about said electrochemical converter array;

a heat exchanging element disposed relative to said pressure vessel for exchanging heat therewith, said heat exchanging element being in fluid communication with said array for delivering the input reactants thereto, wherein said heat exchanging element includes a tubular coil disposed circumferentially about said pressure vessel; and a blower in fluid communication with said heat exchanging element for circulating a heat transfer fluid comprising an input reactant through said heat exchanging element for transferring heat between said pressure vessel and said input reactant prior to delivery thereof to said electrochemical converter.

8. An electrochemical converter system for use with a bottoming device, comprising an electrochemical converter array adapted for receiving input reactants;

a positive pressure vessel disposed about said electrochemical converter array;

a heat exchanging element disposed relative to said pressure vessel for exchanging heat therewith, said heat exchanging element being in fluid communication with said fuel cell array for delivering the input reactants thereto, wherein said heat exchanging element includes a jacket disposed about said pressure vessel; and a blower in fluid communication with said heat exchanging element for circulating a heat transfer fluid including an input reactant through said heat exchanging element for transferring heat between said pressure vessel and said input reactant prior to delivery thereof to said electrochemical converter.

9. An electrochemical converter system for use with a bottoming device, comprising an electrochemical converter array adapted for receiving input reactants;

a positive pressure vessel disposed about said electrochemical converter assembly;

a heat exchanging element disposed relative to said pressure vessel for exchanging heat therewith, said heat exchanging element being in fluid communication with said fuel cell array for delivery of input reactants thereto;

a blower in fluid communication with said heat exchanging element for circulating a heat transfer fluid comprising an input reactant through said heat exchanging element for transferring heat between said pressure vessel and said input reactant prior to delivery thereof to said electrochemical converter; and wherein the bottoming device includes one of a heat actuated chiller, a thermal fluid boiler, a steam boiler, and a heating, ventilation, and an air conditioning system that includes at least one of a thermal fluid boiler and a heat actuated chiller.

10. An electrochemical converter power system, comprising an electrochemical converter adapted for receiving input reactants, a pressure vessel disposed about and in thermal communication with said converter, said electrochemical converter venting exhaust gases comprising spent input reactants to the interior of said pressure vessel, a heat exchanging element disposed with said pressure vessel for exchanging heat therewith, said heat exchanging element adapted for exchanging heat at least with said pressure vessel by flowing a heat exchange fluid including a selected input reactant through said heat exchanger prior to introduction of said selected reactant to said electrochemical converter, and cogeneration bottoming means arranged to receive heated exhaust gases generated by said electrochemical converter, wherein said cogeneration bottoming means is one of a thermal fluid boiler, a steam boiler, a heat actuated chiller including a vapor generator, and a gas turbine.

11. An electrochemical converter power system, comprising an array of electrochemical converters for generating power, said adapter for receiving input reactants, a pressure vessel disposed about said array of electrochemical converters, said pressure vessel collecting exhaust gases generated by said electrochemical converters during operation, means for exhausting said collected exhaust gases from said pressure vessel for use external thereto, and a feedthrough for transfering a fluid from the interior of said pressure vessel to the exterior thereof, said feedthrough including a body extending along a longitudinal axis from a first end for connection to the pressured vessel to a second end, said body further including a first section having an outer pressure jacket disposed about an insulator having a bore therethrough, and a second section including an outer insulative jacket disposed about an inner pressure tube having an inner lumen, wherein said first and second sections are interconnected such that said bore and said inner lumen are in fluid communication for transferring a fluid from the first end of the feedthrough to the second end thereof.

12. The electrochemical converter power system of claim 11, wherein said feedthrough further comprises a pressure disc disposed between said first section and said second sections and joined to said pressure jacket and to said pressure tube to form pressure tight seals therewith.

13. An electrochemical converter system for use with a bottoming device, comprising an electrochemical converter array adapted for receiving input reactants;

a positive pressure vessel disposed about said electrochemical converter array;

a heat exchanging element disposed relative to said pressure vessel for exchanging heat therewith, said heat exchanging element being in fluid communication with said array for delivering the input reactants thereto;

a blower in fluid communication with said heat exchanging element for circulating a heat transfer fluid comprising an input reactant through said heat exchanging element for transferring heat between said pressure vessel and said input reactant prior to delivery thereof to said electrochemical converter, and a feedthrough for transferring a fluid from said pressure vessel to the exterior thereof, said feedthrough including a body extending along a longitudinal axis from a first end for connection to the pressure vessel to a second end, said body further including a first section having an outer pressure jacket disposed about an insulator having a bore therethrough, and a second section including an outer insulative jacket disposed about an inner pressure tube having an inner lumen, wherein said first and second sections are interconnected such that said bore and said inner lumen are in fluid communication for transferring a fluid from the first end of the feedthrough to the second end thereof.

14. An electrochemical converter power system, comprising an electrochemical converter adapted for receiving input reactants, a pressure vessel disposed about and in thermal communication with said electrochemical converter, said electrochemical converter venting exhaust gases including spent input reactants to the interior of said pressure vessel, a heat exchanging element disposed with said pressure vessel for exchanging heat therewith, said heat exchanging element adapted for exchanging heat at least with said pressure vessel by flowing a heat exchange fluid including a selected input reactant through said heat exchanger prior to introduction of said selected reactant to said electrochemical converter, cogeneration bottoming means arranged to receive heated exhaust gases generated by said electrochemical converter, and a feedthrough for transferring a fluid from the interior of said pressure vessel to the exterior thereof, said feedthrough including a body extending along a longitudinal axis from a first end for connection to the pressure vessel to a second end, said body further including a first section having an outer pressure jacket disposed about an insulator having a bore therethrough, and a second section including an outer insulative jacket disposed about an inner pressure tube having an inner lumen, wherein said first and second sections are interconnected such that said bore and said inner lumen are in fluid communication for transferring a fluid from the first end of the feedthrough to the second end thereof.

15. A feedthrough for use with a pressure vessel, comprising a body extending from a first end to a second end along a longitudinal axis and including a first section having an outer pressure jacket disposed about an insulator having a bore therethrough, a second section including an outer insulative jacket disposed about an inner pressure tube having an inner lumen, and wherein said bore and said inner lumen are in fluid communication for-transferring a fluid from a first end of the feedthrough to the second end thereof.

16. The feedthrough of claim 15, further comprising a pressure disc disposed between said first and second sections and joined to said pressure jacket and to said pressure tube to form pressure tight seals therewith.

17. A fluid feedthrough element suitable for use with an electrochemical converter power system, comprising a first feedthrough section having an outer pressure jacket disposed about an inner insulator layer, the inner insulator layer defining a first inner lumen, and a second feedthrough section having an outer insulator layer disposed about an inner pressure jacket, the inner pressure jacket defining a second inner lumen, wherein said first and second inner lumens are disposed in fluid communication with each other when said section are assembled to form a fluid conduit for transferring a fluid from a first end of the assembled feedthrough sections to a second end thereof.

18. The fluid feedthrough element of claim 17, wherein said inner pressure jacket of said second feedthrough section extends outwardly from a first end and terminates in a flange portion, said flange portion being configured for mounting within the first feedthrough section when said first and second sections are assembled.

19. The fluid feedthrough element of claim 17, wherein said outer pressure jacket of said first feedthrough section terminates in a flange.

20. The fluid feedthrough element of claim 17, wherein said flange is formed at an end of said outer pressure jacket opposite the end thereof adapted for mounting to the second feedthrough section.

21. The fluid feedthrough element of claim 17, wherein said inner pressure jacket of said second section extends outwardly from a first end and is configured for mounting within the first feedthrough section when assembled.

22. The fluid feedthrough element of claim 17, further comprising a pressure disc disposed between the first and second feedthrough sections for joining said sections together.

23. The fluid feedthrough element of claim 17, further comprising weld means for attaching said pressure disc to said outer pressure jacket of said first feedthrough section and to said inner pressure jacket of said second feedthrough means.

24. The fluid feedthrough element of claim 17, wherein said inner pressure jacket of said second feedthrough section terminates in a flange at an end opposite an end of the second feedthrough section that coupled to the first feedthrough section when assembled.

25. A fluid feedthrough element suitable for use with an electrochemical converter power system, comprising
- a first feedthrough section having a first pressure jacket having a first diameter and defining a first inner lumen, and
- a second feedthrough section having a second pressure jacket having a second diameter and defining a second inner lumen,
- wherein said first diameter is larger than said second diameter and wherein said first and second inner lumens are disposed in fluid communication with each other when assembled to form a fluid conduit for transferring a fluid from a first end of the feedthrough to a second end thereof.

26. A system for coupling an electrochemical power subsystem to a bottoming device, comprising
- a first feedthrough section having an outer pressure jacket disposed about an inner insulator layer, the inner insulator layer defining a first inner lumen,
- a second feedthrough section having an outer insulator layer disposed about an inner pressure jacket, the inner pressure jacket defining a second inner lumen, and
- a pressure disc disposed between the first and second feedthrough sections for coupling the sections together,
- wherein said first and second inner lumens are disposed in fluid communication with each other when assembled to form a fluid conduit for transferring a fluid from the electrochemical converter power subsystem at a first end of the system to a bottoming device coupled to a second end of the system.

27. The system of claim 26, further comprising a flange formed at an end of the outer pressure jacket opposite the end coupled to the pressure disc, said flange being sized and dimensioned for coupling to the electrochemical power subsystem.

28. The system of claim 26, further comprising a flange formed at an end of the inner pressure jacket opposite the end coupled to the pressure disc, said flange being sized and dimensioned for coupling to the bottoming device.

29. An electrochemical converter power system, comprising
- one or more electrochemical converters for generating power and adapted for receiving input reactants,
- a pressure vessel disposed about said electrochemical converter for collecting exhaust produced by the electrochemical converter during operation, wherein said pressure vessel includes an inner wall and an outer wall and an inner lumen formed between the walls for carrying a fluid, and
- means for passing said fluid through said inner lumen of said pressure vessel for maintaining the pressure vessel at a selected temperature.

30. The electrochemical power system of claim 29, wherein said means for passing said fluid comprises a blower coupled to said pressure vessel for blowing said fluid through said inner lumen.

31. The electrochemical power system of claim 29, wherein said means for passing said fluid comprises a pump coupled to said pressure vessel for drawing said fluid through said inner lumen.

32. The electrochemical power system of claim 29, wherein said means for passing said fluid comprises a compressor coupled to said pressure vessel for drawing said fluid through said inner lumen.

33. An electrochemical converter power system, comprising
- one or more electrochemical converters for generating power and adapted for receiving input reactants,
- a pressure vessel disposed about said electrochemical converter for collecting exhaust produced by the electrochemical converter during operation,
- a cooling jacket disposed about the pressure vessel and forming an inner lumen therebetween for carrying a fluid, and
- means for passing said fluid through said inner lumen of said pressure vessel for maintaining the pressure vessel at a selected temperature.

34. An method for producing power with an electrochemical converter power system, comprising the steps of
- providing an array of electrochemical converters for generating power, said array adapted for receiving input reactants,
- disposing said array of converters within a pressure vessel,
- collecting exhaust gases generated by said electrochemical converters during operation in said pressure vessel, and
- exhausting said collected exhaust gases from said pressure vessel for use external thereto.

35. The method of claim 34, further comprising at least one of the following steps of
- pre-heating the electrochemical converter,
- preheating an oxidizer input reactant or a fuel input reactant,
- preheating a steam input reactant,
- reforming at least one input reactant to produce a resultant,
- heating the electrochemical converter array for maintaining steady state operation of said array,
- cooling the electrochemical converter array for maintaining steady state operation of said array, and
- regulating the temperature of said electrochemical converter.

36. The method of claim 34, further comprising the step of providing temperature regulation elements for receiving the input reactant for combustively heating said electrochemical converter.

37. The method of claim 34, further comprising the step of introducing the exhaust gases produced by said electrochemical converter array to a steam boiler for the generation of steam.

38. A method of producing power with an electrochemical converter system suitable for use with a bottoming device, comprising the steps of
- disposing an electrochemical converter array adapted for receiving input reactants in a positive pressure vessel,
- disposing a heat exchanging element relative to said pressure vessel for exchanging heat therewith, said heat exchanging element being in fluid communication with said array for delivering the input reactants thereto,
- circulating a heat transfer fluid through said heat exchanging element with a blower for transferring heat between said pressure vessel and said input reactant prior to delivery thereof to said electrochemical converter.

39. The method of claim 38, wherein said heat exchanging element comprises a tubular coil disposed circumferentially about said pressure vessel.

40. The method of claim 38, wherein said heat exchanging element comprises a jacket disposed about said pressure vessel.

41. The method of claim 38, wherein the bottoming device comprises one of a heat actuated chiller, a thermal fluid boiler, a steam boiler, and a heating, ventilation, and an air conditioning system that includes at least one of a thermal fluid boiler and a heat actuated chiller.

42. The method of claim 38, further comprising the step of providing a feedthrough for transferring a fluid from the interior of said pressure vessel to the exterior thereof.

43. The method of claim 38, wherein said step of providing a feedthrough comprises the step of configuring said feedthrough having     a body extending along a longitudinal axis from a first end for connection to the pressure vessel to a second end, said body further including     a first section having an outer pressure jacket disposed about an insulator having a bore therethrough, and     a second section including an outer insulative jacket disposed about an inner pressure tube having an inner lumen, wherein said first and second sections are interconnected such that said bore and said inner lumen are in fluid communication for transferring a fluid from the first end of the feedthrough to the second end thereof.

\* \* \* \* \*

UNITED STATES PATENT AND TRADEMARK OFFICE
CERTIFICATE OF CORRECTION

PATENT NO. : 6,024,859
DATED : February 15, 2000
INVENTOR(S) : Hsu

It is certified that error appears in the above-identified patent and that said Letters Patent is hereby corrected as shown below:

<u>Column 18,</u>
Line 47, delete: "...power, said adapter for ..." and insert: " ...power, said array adapted for ...";
Line 58, delete: "...to the pressured vessel ..." and insert: "...to the pressure vessel..."

Signed and Sealed this

Twenty-fifth Day of September, 2001

*Attest:*

*Nicholas P. Godici*

*Attesting Officer*

NICHOLAS P. GODICI
*Acting Director of the United States Patent and Trademark Office*